(No Model.) 2 Sheets—Sheet 1.
J. H. SMITH, A. GODDARD, L. HIGGINBOTTOM & T. MANNOCK.
APPARATUS FOR CUTTING PILE FABRICS.
No. 448,088. Patented Mar. 10, 1891.
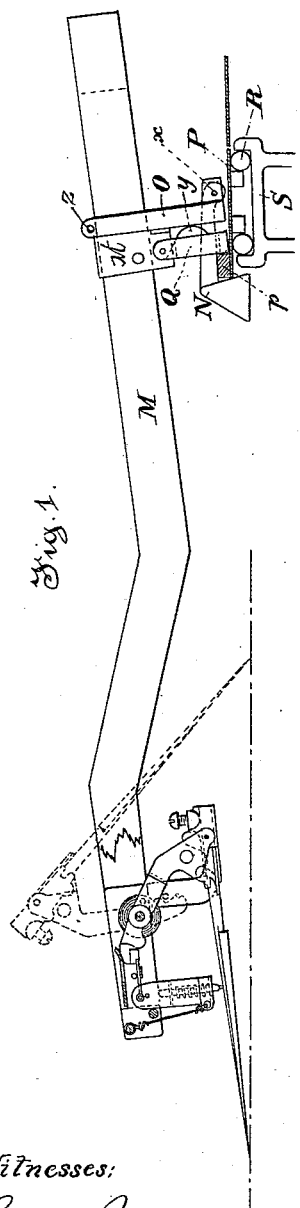
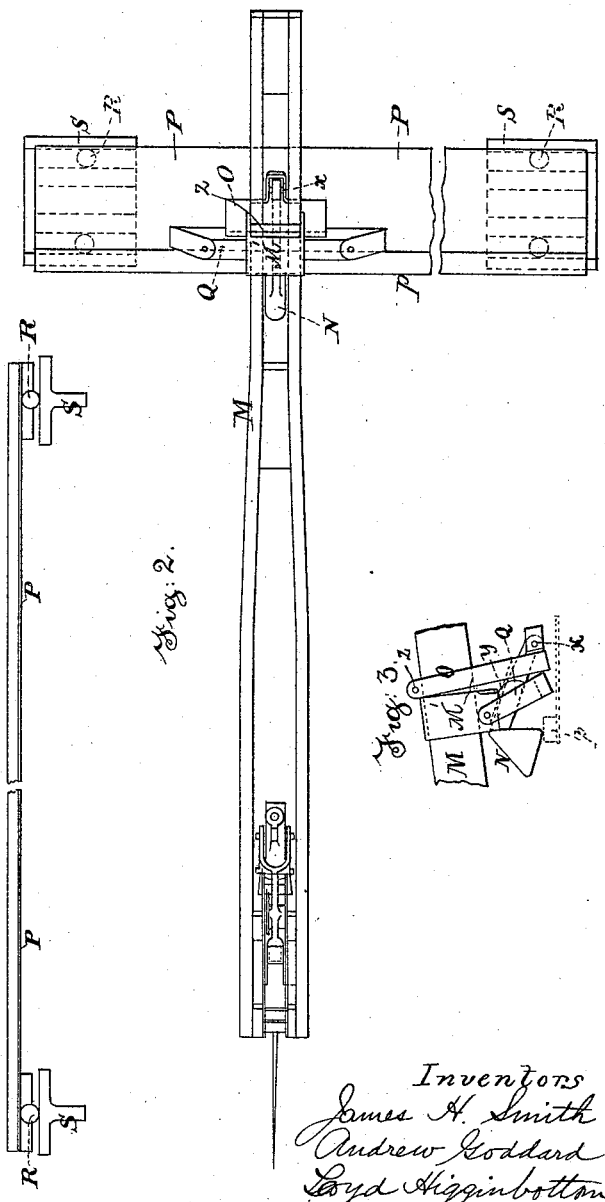
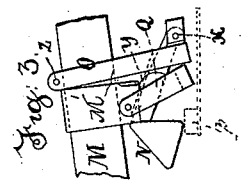
Witnesses:
George Baumann
John Revell
Inventors
James H. Smith
Andrew Goddard
Loyd Higginbottom
Thomas Mannock
By their Attys.
Howson and Howson (No Model.) 2 Sheets—Sheet 2.
J. H. SMITH, A. GODDARD, L. HIGGINBOTTOM & T. MANNOCK.
APPARATUS FOR CUTTING PILE FABRICS.
No. 448,088. Patented Mar. 10, 1891.
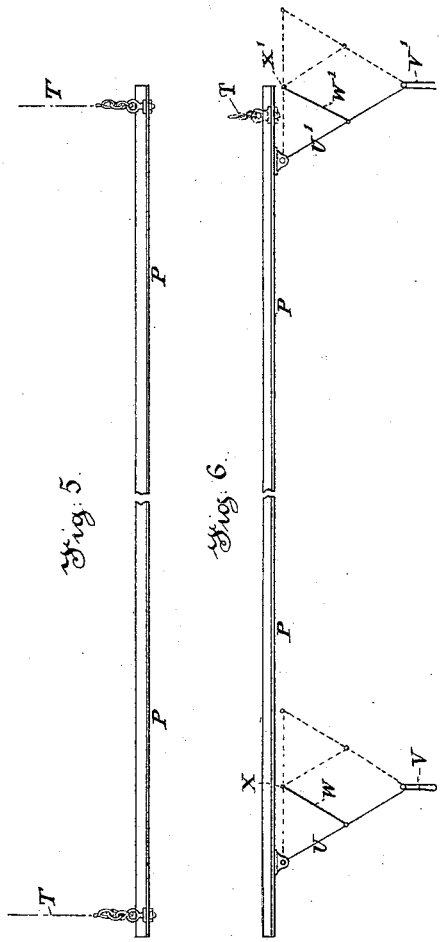
Witnesses
George Baumann
John Revell
Inventors
James H. Smith
Andrew Goddard
Loyd Higginbottom
Thomas Mannock
By their Attys.
Howson and Howson

UNITED STATES PATENT OFFICE.

JAMES HOYLE SMITH, OF ECCLES, ANDREW GODDARD, OF STOCKPORT, AND LLOYD HIGGINBOTTOM AND THOMAS MANNOCK, OF MANCHESTER, ASSIGNORS TO THE FUSTIAN CUTTING MACHINE COMPANY, (LIMITED,) OF ORDSALL LANE MILLS, SALFORD, ENGLAND.

APPARATUS FOR CUTTING PILE FABRICS.

SPECIFICATION forming part of Letters Patent No. 448,088, dated March 10, 1891.

Application filed September 22, 1890. Serial No. 365,769. (No model.) Patented in England June 15, 1889, No. 9,863.

*To all whom it may concern:*

Be it known that we, JAMES HOYLE SMITH, ANDREW GODDARD, LLOYD HIGGINBOTTOM, and THOMAS MANNOCK, subjects of the Queen of Great Britain, residing, respectively, at Eccles, Stockport, and Manchester, England, have invented Improvements in Apparatus for Cutting Pile Fabrics, (for which we have obtained a patent in Great Britain, No. 9,863, dated June 15, 1889,) of which the following is a specification.

This invention relates to that class of apparatus wherein the fabric of which the pile is to be cut is passed below a knife mounted upon a table.

The object of our invention is to improve the means of supporting the handle end of the knife and of causing the "level" of the knife to grip the edge of the table supporting the same, and in order that our invention may be clearly understood we have annexed hereunto two sheets of drawings and have marked the same with figures and reference-letters corresponding with those in the following description.

Figure 1 is an elevation, partly in section, of our improved apparatus. Fig. 2 is a plan view thereof, part of the table being shown broken away. Fig. 3 is a detached view of part of the knife-handle and level hereinafter referred to. Fig. 4 is a partial front elevation of the table and its supports alone. Figs. 5 and 6 are diagrams illustrating modified means for supporting the table.

Owing to the uneven nature of the pieces of cloth to be cut the race in which the knife is cutting does not run truly in the machine, but sways from side to side, taking the knife with it. In order to enable the knife to follow this lateral motion readily, we make the table carrying the knife free to travel from side to side with the knife by means of arrangements to be presently described, and we cause the level of the knife to grip the front edge of the table by the following arrangement: A hook N is pivoted at $x$ to the back member O of the level in such a manner as to fall over and engage with the rib $p$ riveted to the front edge of the table P. The back member O vibrates on a pin $z$ at its upper end, which pin is fixed to a sleeve M' on the handle M of the knife. The front member Q or level proper is pivoted to the sleeve M' at its upper end and has a projection $y$ at the back, which bears against the face of the back member O. If now the knife has been entered in the race and slid forward until the hook N has engaged with the front rib $p$ of the table, (see Fig. 1,) then on the machine being started the resistance offered by the cloth to the knife tends to force the knife-handle M backward. The hook N, having hold of the rib $p$, cannot move backward, and being pivoted to the back member O retains the lower part of this member. When the part $y$ on the front member Q comes in contact with the back member, this front member is tilted, and the more the upper part thereof is pushed back the more tightly will the lower part press against the back of the rib $p$, so that the knife-handle M is firmly clamped to the table P and causes this to partake of its lateral motion.

In order to release the knife and level from the table, the handle M is pushed forward, tilting the member Q in a way to release the pressure of its lower end from the rib $p$, when the hook N can be lifted out of engagement with the rib $p$ to allow the handle to be withdrawn, as indicated at Fig. 3.

At Figs. 1, 2, and 4 is shown one arrangement of the table for allowing it to follow freely the lateral movement of the knife. In this arrangement the table P is mounted upon its supporting-frame S, with the interposition of rollers R, (by preference of spherical form,) one roller being placed at each corner of the table and made to bear against the planed edges fixed on the framing of the machine and against pieces riveted to the under side of the table, thus allowing the table perfect freedom to move laterally in either direction to the extent of about two inches from the central position.

Fig. 5 shows an arrangement in which the table P is suspended by two or more cords T from the ceiling of any convenient part of the machine.

Fig. 6 shows an arrangement in which the table P is carried upon swinging arms U and U', pivoted at their upper ends to the under side of the table, while the lower ends are free to slide up and down in the fixed slots V V', the arms being connected by pins at their middle to pendulum-arms W W', the upper ends of which are pivoted to the framing of the machine at X X', so that these arms support the table P and maintain it in one and the same plane while it swings to and fro laterally on the arms U U', the pivots of which offer very little resistance to such motion.

Any liability of the table to be pushed in the direction of the cloth's travel by the resistance offered to the knife in cutting may be counteracted either by another pair of horizontal radial arms pivoted thereto or by horizontal cords or other means. The table may also be controlled by a combination of the arrangements shown at Figs. 5 and 6. This combination is represented by Fig. 6, in which one of the cords T is shown in dotted lines.

We are aware that an arrangement of knife-table has been proposed in which the table is capable of being traversed laterally by screw-gear; also, that a construction of knife-table has been used which is supported upon the rollers that carry the cloth and which has side cheeks bearing against the edges of the cloth, so as to have any lateral motion of the latter imparted to it; but these arrangements are different from and do not accomplish the object of our invention, as in neither of them is the table free to follow the lateral motion of the knife alone.

We claim as our invention—

1. In machines for cutting pile fabrics, the combination of the knife with a level composed of a sleeve or its equivalent fixed to the handle of the knife, a front and a back member pivoted to the sleeve, and a hook pivoted to the back member, the said hook and the front member being adapted to clamp the table when the knife is forced backward, substantially as and for the purposes set forth.

2. In machines for cutting pile fabrics, the combination of a knife for cutting the pile fabric with a laterally-movable table to which the knife is clamped, the said table being free to follow the lateral motion of the knife, substantially as and for the purposes set forth.

3. In machines for cutting pile fabrics, the combination of a knife with a table to which the knife is clamped, the said table being mounted upon a supporting-frame and provided with pieces attached to the under side of the table, and rollers between the supporting-frame and the table, substantially as and for the purpose set forth.

In testimony whereof we have signed our names to this specification in the presence of two subscribing witnesses.

JAMES HOYLE SMITH.
ANDREW GODDARD.
LLOYD HIGGINBOTTOM.
THOMAS MANNOCK.

Witnesses:
CHARLES A. DAVIES,
JNO. HUGHES.